US010860371B2

(12) United States Patent
Rizvi et al.

(10) Patent No.: US 10,860,371 B2
(45) Date of Patent: *Dec. 8, 2020

(54) TECHNIQUES FOR ADAPTING BEHAVIORAL PAIRING TO RUNTIME CONDITIONS IN A TASK ASSIGNMENT SYSTEM

(71) Applicant: Afiniti, Ltd., Hamilton (BM)

(72) Inventors: Syed Meesum Raza Rizvi, Islamabad (PK); Vikash Khatri, Alexandria, VA (US)

(73) Assignee: Afiniti Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,388

(22) Filed: Dec. 3, 2019

(65) Prior Publication Data
US 2020/0104168 A1 Apr. 2, 2020

Related U.S. Application Data

(63) Continuation of application No. 16/146,783, filed on Sep. 28, 2018, now Pat. No. 10,496,438.

(51) Int. Cl.
*G06F 9/48* (2006.01)
(52) U.S. Cl.
CPC ................. *G06F 9/4881* (2013.01)
(58) Field of Classification Search
CPC ... G06F 9/4881; H04M 3/5175; H04M 3/523; H04M 2203/401; H04M 3/5232
USPC ............ 379/265.01, 265.02, 265.05, 265.06, 379/266.01, 309
See application file for complete search history.

(56) References Cited

U.S. PATENT DOCUMENTS

| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |

(Continued)

FOREIGN PATENT DOCUMENTS

| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft. com, Issue Jun. 2002 (3 pages).

(Continued)

*Primary Examiner* — Quynh H Nguyen
(74) *Attorney, Agent, or Firm* — Wilmer Cutler Pickering Hale and Dorr LLP

(57) ABSTRACT

Techniques for adapting behavioral pairing to runtime conditions in a task assignment system are disclosed. In one particular embodiment, the techniques may be realized as a method for adapting behavioral pairing to runtime conditions in a task assignment system comprising: determining, by at least one computer processor communicatively coupled to and configured to operate in the task assignment system, at least two pairing models for assigning tasks in the task assignment system; monitoring, by the at least one computer processor, at least one parameter of the task assignment system; and selecting, by the at least one computer processor, one of the at least two pairing models based on a value of the at least one parameter.

27 Claims, 3 Drawing Sheets

(56) References Cited

U.S. PATENT DOCUMENTS

| | | |
|---|---|---|
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,313,332 B1 | 4/2016 | Kumar et al. |
| 9,426,296 B2 | 8/2016 | Chishti et al. |
| 9,712,676 B1 | 7/2017 | Chishti |
| 9,712,679 B2 | 7/2017 | Chishti et al. |
| 9,888,121 B1 | 2/2018 | Chishti |
| 9,930,180 B1 | 3/2018 | Kan et al. |
| 9,942,405 B1 | 4/2018 | Kan et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |

(56) References Cited

U.S. PATENT DOCUMENTS

| | | |
|---|---|---|
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0310773 A1 | 12/2011 | Iyengar et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0022195 A1 | 1/2013 | Nimmagadda |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0064080 A1 | 3/2017 | Chishti et al. |
| 2017/0064081 A1 | 3/2017 | Chishti et al. |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |
| EP | 1335572 A2 | 8/2003 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-069168 A | 3/2002 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| PH | 1-2011-500868 | 6/2015 |
| WO | WO-99/17517 A1 | 4/1999 |
| WO | WO-00/70849 A2 | 11/2000 |
| WO | WO-2001/063894 A2 | 8/2001 |
| WO | WO-2006/124113 A2 | 11/2006 |

(56) References Cited

FOREIGN PATENT DOCUMENTS

| WO | WO-2008/124113 A1 | 10/2008 |
| WO | WO-2009/097018 A1 | 8/2009 |
| WO | WO-2009/097210 A1 | 8/2009 |
| WO | WO-2010/053701 A2 | 5/2010 |
| WO | WO-2011/081514 A1 | 7/2011 |
| WO | WO-2013/148453 A1 | 10/2013 |
| WO | WO-2016/048290 A1 | 3/2016 |

OTHER PUBLICATIONS

Cleveland, William S., "Robust Locally Weighted Regression and Smoothing Scatterplots," Journal of the American Statistical Association, vol. 74, No. 368, Dec. 1979, pp. 829-836 (8 pages).

Cormen, T. H., et al., "Introduction to Algorithms," 3rd Edition, Chapter 26 Maximum Flow, pp. 708-766 and Chapter 29 Linear Programming, pp. 843-897 (2009).

Gans, N. et al., "Telephone Call Centers: Tutorial, Review and Research Prospects," Manufacturing & Service Operations Management, vol. 5, No. 2, 2003, pp. 79-141, (84 pages).

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al., "An Overview of Routing and Staffing Algorithms in Multi-Skill Customer Contact Centers," Manuscript, Mar. 6, 2006, (42 pages).

Nocedal, J. and Wright, S. J., "Numerical Optimization," Chapter 16 Quadratic Programming, pp. 448-496 (2006) 50 pages.

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591 (8 pages).

Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).

TECHNIQUES FOR ADAPTING BEHAVIORAL PAIRING TO RUNTIME CONDITIONS IN A TASK ASSIGNMENT SYSTEM

CROSS-REFERENCE TO RELATED APPLICATIONS

This application is a continuation of U.S. patent application Ser. No. 16/146,783, filed Sep. 28, 2018 (now U.S. Pat. No. 10,496,438), which is hereby incorporated by reference herein in its entirety.

FIELD OF THE DISCLOSURE

The present disclosure generally relates to behavioral pairing and, more particularly, to techniques for adapting behavioral pairing to runtime conditions in a task assignment system.

BACKGROUND OF THE DISCLOSURE

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an "L2" environment, multiple tasks are waiting in a queue for assignment to an agent. When an agent becomes available, the task at the head of the queue would be selected for assignment to the agent.

Some task assignment systems prioritize some types of tasks ahead of other types of tasks. For example, some tasks may be high-priority tasks, while other tasks are low-priority tasks. Under a FIFO strategy, high-priority tasks will be assigned ahead of low-priority tasks.

In other typical task assignment systems, a performance-based routing (PBR) strategy for prioritizing higher-performing agents for task assignment may be implemented. Under PBR, for example, the highest-performing agent among available agents receives the next available task. Other PBR and PBR-like strategies may make assignments using specific information about agents but without necessarily relying on specific information about tasks.

In some typical task assignment systems, a behavioral pairing (BP) model may be generated based on historical task-agent assignment data to optimize performance of the task assignment system. For example, in a contact center environment, the BP model may be calibrated to optimize revenue in a sales queue or to reduce average handle time in a sales or customer service queue.

In some task assignment systems, a goal for optimizing the task assignment system or a particular queue of the task assignment system may change at runtime (i.e., in real time) based on conditions in the task assignment system that can change at any moment.

In view of the foregoing, it may be understood that there may be a need for a task assignment system that can adapt to changing goals at runtime.

SUMMARY OF THE DISCLOSURE

Techniques for adapting behavioral pairing to runtime conditions in a task assignment system are disclosed. In one particular embodiment, the techniques may be realized as a method for adapting behavioral pairing to runtime conditions in a task assignment system comprising: determining, by at least one computer processor communicatively coupled to and configured to operate in the task assignment system, at least two pairing models for assigning tasks in the task assignment system; monitoring, by the at least one computer processor, at least one parameter of the task assignment system; and selecting, by the at least one computer processor, one of the at least two pairing models based on a value of the at least one parameter.

In accordance with other aspects of this particular embodiment, the task assignment system may be a contact center system.

In accordance with other aspects of this particular embodiment, monitoring the at least one parameter may comprise detecting a change of state between an agent surplus and a task surplus In accordance with other aspects of this particular embodiment, monitoring the at least one parameter may comprise detecting a change in size of a queue of tasks in the task assignment system.

In accordance with other aspects of this particular embodiment, monitoring the at least one parameter may comprise detecting a failure or a recovery in at least one of a site, a server, a switch, and a workstation of the task assignment system.

In accordance with other aspects of this particular embodiment, monitoring the at least one parameter may comprise detecting a change in a number of agents that is assigned to tasks, available, logged in, or idle.

In accordance with other aspects of this particular embodiment, monitoring the at least one parameter may comprise detecting a change in a time of day or an amount of elapsed time.

In accordance with other aspects of this particular embodiment, at least one of the at least two pairing models may be a diagonal behavioral pairing model.

In accordance with other aspects of this particular embodiment, at least one of the at least two pairing models may be a behavioral pairing payout matrix model.

In accordance with other aspects of this particular embodiment, a goal of one of the at least two pairing models may be one of increasing revenue, decreasing average handling time, improving customer satisfaction, increasing upgrade/cross-sell rates, and increasing customer retention rates.

In another particular embodiment, the techniques may be realized as a system for adapting behavioral pairing to runtime conditions in a task assignment system comprising at least one computer processor communicatively coupled to and configured to operate in the task assignment system, wherein the at least one computer processor is further configured to perform the steps in the above-described method.

In another particular embodiment, the techniques may be realized as an article of manufacture for adapting behavioral pairing to runtime conditions in a task assignment system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
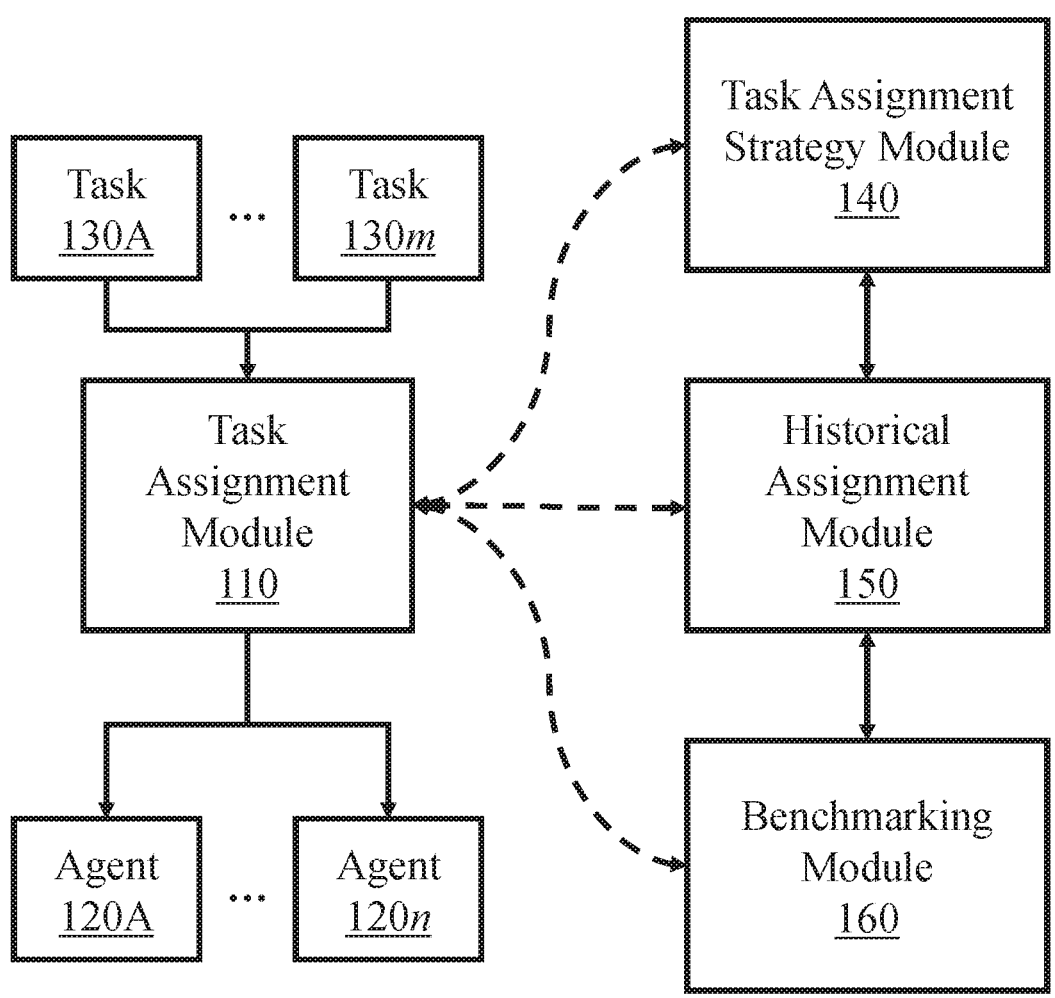
FIG. 1 shows a block diagram of a task assignment system according to embodiments of the present disclosure.

A typical task assignment system algorithmically assigns tasks arriving at the task assignment center to agents available to handle those tasks. At times, the task assignment system may have agents available and waiting for assignment to tasks. At other times, the task assignment center may have tasks waiting in one or more queues for an agent to become available for assignment.

In some typical task assignment centers, tasks are assigned to agents ordered based on time of arrival, and agents receive tasks ordered based on the time when those agents became available. This strategy may be referred to as a "first-in, first-out," "FIFO," or "round-robin" strategy. For example, in an "L2" environment, multiple tasks are waiting in a queue for assignment to an agent. When an agent becomes available, the task at the head of the queue would be selected for assignment to the agent.

Some task assignment systems prioritize some types of tasks ahead of other types of tasks. For example, some tasks may be high-priority tasks, while other tasks are low-priority tasks. Under a FIFO strategy, high-priority tasks may be assigned ahead of low-priority tasks.

In other typical task assignment systems, a performance-based routing (PBR) strategy for prioritizing higher-performing agents for task assignment may be implemented. Under PBR, for example, the highest-performing agent among available agents receives the next available task. Other PBR and PBR-like strategies may make assignments using specific information about gents but without necessarily relying on specific information about tasks.

In some typical task assignment systems, a behavioral pairing (BP) model may be generated based on historical task-agent assignment data to optimize performance of the task assignment system. For example, in a contact center environment, the BP model may be calibrated to optimize revenue in a sales queue or to reduce average handle time in a sales or customer service queue.

In some task assignment systems, a goal for optimizing the task assignment system or a particular queue of the task assignment system may change at runtime (i.e., in real time) based on conditions in the task assignment system that can change at any moment.

In view of the foregoing, it may be understood that there may be a need for a task assignment system that can adapt to changing goals at runtime, as described below.

The description herein describes network elements, computers, and/or components of a system and method for benchmarking pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

FIG. 1 shows a block diagram of a task assignment system 100 according to embodiments of the present disclosure. The task assignment system 100 may include a task assignment module 110. The task assignment system 100 may include a switch or other type of routing hardware and software for helping to assign tasks among various agents, including queuing or switching components or other Internet-, cloud-, or network-based hardware or software solutions.

The task assignment module 110 may receive incoming tasks. In the example of FIG. 1, the task assignment system 100 receives m tasks over a given period, tasks 130A-130m. Each of the m tasks may be assigned to an agent of the task assignment system 100 for servicing or other types of task processing. In the example of FIG. 1, n agents are available during the given period, agents 120A-120n. m and n may be arbitrarily large finite integers greater than or equal to one. In a real-world task assignment system, such as a contact center, there may be dozens, hundreds, etc. of agents logged into the contact center to interact with contacts during a shift, and the contact center may receive dozens, hundreds, thousands, etc. of contacts (e.g., calls) during the shift.

In some embodiments, a task assignment strategy module 140 may be communicatively coupled to and/or configured to operate in the task assignment system 100. The task assignment strategy module 140 may implement one or more task assignment strategies (or "pairing strategies") or one more models of a task assignment strategy for assigning individual tasks to individual agents (e.g., pairing contacts with contact center agents). For a given task queue (e.g., a sales queue in a contact center system, a truck roll or field agent dispatch queue in a dispatch queue center, etc.), the task assignment strategy module 140 may implement more than one model for more than one condition or goal. For example, in a sales queue, one goal may be to increase overall revenue generated by agents processing tasks in the sales queue (e.g., talking to callers in a call center interested in buying services from the company of the agents). A second goal may be to reduce average handle time (AHT)

for tasks (e.g., complete a sales call relatively quickly). Historical task-agent pairing data may be available (e.g., from historical assignment module 150, which is described below) that includes both revenue and duration information, and two different models or sets of models may be generated that are calibrated to their respective goals of increasing revenue or decreasing average handle time.

A variety of different task assignment strategies may be devised and implemented by the task assignment strategy module 140, and made available to the task assignment module 110 at runtime. In some embodiments, a FIFO strategy may be implemented in which, for example, the longest-waiting agent receives the next available task (in L1 environments) or the longest-waiting task is assigned to the next available task (in L2 environments). Other FIFO and FIFO-like strategies may make assignments without relying on information specific to individual tasks or individual agents.

In other embodiments, a PBR strategy for prioritizing higher-performing agents for task assignment may be implemented. Under PBR, for example, the highest-performing agent among available agents receives the next available task. Other PBR and PBR-like strategies may make assignments using information about specific agents but without necessarily relying on information about specific tasks or agents.

In yet other embodiments, a BP strategy may be used for optimally assigning tasks to agents using information about both specific tasks and specific agents. Various models of the BP strategy may be used, such as a diagonal model BP strategy, a payout matrix BP strategy, or a network flow BP strategy. These task assignment strategies and others are described in detail for the contact center context in, e.g., U.S. Pat. Nos. 9,300,802 and 9,930,180, which are hereby incorporated by reference herein. BP strategies may be applied in an "L1" environment (agent surplus, one task; select among multiple available/idle agents), an "L2" environment (task surplus, one available/idle agent; select among multiple tasks in queue), and an "L3" environment (multiple agents and multiple tasks; select among pairing permutations).

In some embodiments, the task assignment strategy module 140 may be configured to switch from one task assignment strategy to another task assignment strategy, or from one model of a task assignment strategy to another model of the task assignment strategy, in real time. A goal for optimizing the task assignment system 100 or a particular queue of the task assignment system 100 may change at runtime (i.e., in real time) based on conditions or parameters in the task assignment system 100 that can change at any moment. For example, a condition may be based on the size of the task queue. When the task assignment system 100 is operating in L1 (i.e., agent surplus), or the size of the task queue in L2 is less than (or equal to) a certain size (e.g., 5, 10, 20 tasks, etc.), the task assignment system 100 may operate with the goal of increasing revenue and the task assignment strategy module 140 may select a model or a set of models corresponding to that goal. When the task assignment system 100 detects that the size of the task queue in L2 is greater than (or equal to) a threshold size, the task assignment strategy module 140 may switch to operate with the goal of decreasing average handle time and switch to a model or set of models corresponding to the new goal. Examples of other goals may include improving customer satisfaction (e.g., customer satisfaction (CSAT) scores or Net Promoter Scores), increasing upgrade/cross-sell rates, increasing customer retention rates, decreasing AHT, etc. Example of other conditions or parameters may include switching between L1 and L2 (i.e., switching between agent surplus and task surplus conditions), unexpected reduction in capacity (e.g., sites/queues/agents workstations/server/switch failure or recovery), number of agents assigned to the task queue (or number of agents available/logged in/idle), schedule-based/cycling changes to the goals and models (which can be benchmarked similarly to benchmarking ON/OFF cycles between two pairing strategies, as described below), time of the day or amount of elapsed time (for schedule-based cycling of models and benchmarking), etc.

In some embodiments, an operator or manager of the task assignment system 100 may select or switch goals or models manually. In response to the operator's selection, the task assignment strategy module 140 may switch models in real time. In other embodiments, the task assignment strategy module 140 may monitor the task assignment system 100 for certain conditions or parameters and, in response to detecting particular changes in these conditions or parameters, may select or switch goals and models automatically. In yet other embodiments, the conditions that trigger switching the goals or models may be determined automatically as part of a super- or meta-model from analyzing historical task-agent assignment data (available from historical assignment module 150, which is described below).

In some embodiments, a historical assignment module 150 may be communicatively coupled to and/or configured to operate in the task assignment system 100 via other modules such as the task assignment module 110 and/or the task assignment strategy module 140. The historical assignment module 150 may be responsible for various functions such as monitoring, storing, retrieving, and/or outputting information about agent task assignments that have already been made. For example, the historical assignment module 150 may monitor the task assignment module 110 to collect information about task assignments in a given period. Each record of a historical task assignment may include information such as an agent identifier, a task or task type identifier, outcome information, or a pairing strategy identifier (i.e., an identifier indicating whether a task assignment was made using a BP pairing strategy or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or similar computer processor-generate model based on a set of historical assignments for a period of time (e.g., the past week, the past month, the past year, etc.), which may be used by the task assignment strategy module 140 to make task assignment recommendations or instructions to the task assignment module 110. In other embodiments, the historical assignment module 150 may send historical assignment information to another module such as the task assignment strategy module 140 or the benchmarking module 160.

In some embodiments, a benchmarking module 160 may be communicatively coupled to and/or configured to operate in the task assignment system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of the task assignment strategy to determine, for example, whether a different task assignment strategy (or a different pairing model) should be used, or to measure the overall performance (or performance gain) that was achieved within the task assignment system 100 while it was optimized or otherwise configured to use one task assignment strategy instead of another.

Figure 2:
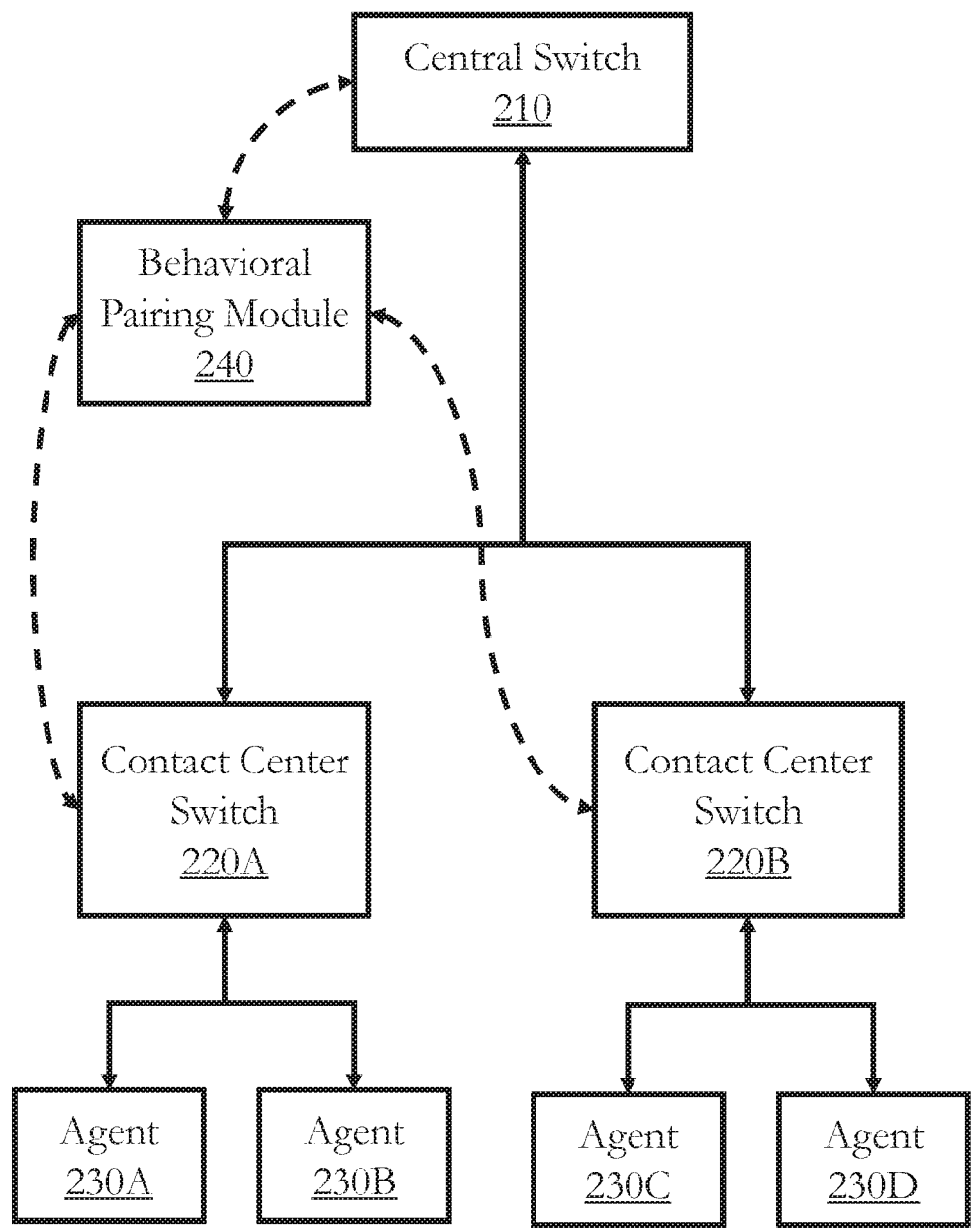
FIG. 2 shows a block diagram of a contact center system according to embodiments of the present disclosure.

FIG. 2 shows a block diagram of a contact center system 200 according to embodiments of the present disclosure. As shown in FIG. 2, the contact center system may include a central switch 210. The central switch 210 may receive incoming contacts (e.g., callers) or support outbound connections to contacts via a dialer, a telecommunications network, or other modules (not shown). The central switch 210 may include contact routing hardware and software for helping to route contacts among one or more contact centers, or to one or more PBX/ACDs or other queuing or switching components within a contact center.

The central switch 210 may not be necessary if there is only one contact center, or if there is only one PBX/ACD routing component, in the contact center system 200. If more than one contact center is part of the contact center system 200, each contact center may include at least one contact center switch (e.g., contact center switches 220A and 220B). The contact center switches 220A and 220B may be communicatively coupled to the central switch 210. Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 2, the central switch 210 routes contacts to one of two contact centers via contact center switch 220A and contact center switch 220B, respectively. Each of the contact center switches 220A and 220B are shown with two agents each. Agents 230A and 230B may be logged into contact center switch 220A, and agents 230C and 230D may be logged into contact center switch 220B.

The contact center system 200 may also be communicatively coupled to an integrated service from, for example, a third-party vendor. In the example of FIG. 2, behavioral pairing module 240 may be communicatively coupled to one or more switches in the switch system of the contact center system 200, such as central switch 210, contact center switch 220A, or contact center switch 220B. In some embodiments, switches of the contact center system 200 may be communicatively coupled to multiple behavioral pairing modules. In some embodiments, behavioral pairing module 240 may be embedded within a component of a contact center system (e.g., embedded in or otherwise integrated with a switch).

Behavioral pairing module 240 may receive information from a switch (e.g., contact center switch 220A) about agents logged into the switch (e.g., agents 230A and 230B) and about incoming contacts via another switch (e.g., central switch 210) or, in some embodiments, from a network (e.g., the Internet or a telecommunications network) (not shown).

The behavioral pairing module 240 may process this information and to determine which contacts should be paired (e.g., matched, assigned, distributed, routed) with which agents. For example, multiple agents are available and waiting for connection to a contact (L1 state), and a contact arrives at the contact center via a network or central switch. As explained above, without the behavioral pairing module 240, a contact center switch will typically automatically distribute the new contact to whichever available agent has been waiting the longest amount of time for an agent under a "fair" FIFO strategy, or whichever available agent has been determined to be the highest-performing agent under a PBR strategy.

With a behavioral pairing module 240, contacts and agents may be given scores (e.g., percentiles or percentile ranges/bandwidths) according to a pairing model or other artificial intelligence data model, so that a contact may be matched, paired, or otherwise connected to a preferred agent.

In an L2 state, multiple contacts are available and waiting for connection to an agent, and an agent becomes available. These contacts may be queued in a contact center switch such as a PBX or ACD device ("PBX/ACD"). Without the behavioral pairing module 240, a contact center switch will typically connect the newly available agent to whichever contact has been waiting on hold in the queue for the longest amount of time as in a "fair" FIFO strategy or a PBR strategy when agent choice is not available. In some contact centers, priority queuing may also be incorporated, as previously explained.

With a behavioral pairing module 240 in an L2 scenario, as in the L1 state described above, contacts and agents may be given percentiles (or percentile ranges/bandwidths, etc.) according to, for example, a model, such as an artificial intelligence model, so that an agent coming available may be matched, paired, or otherwise connected to a preferred contact.

Figure 3:
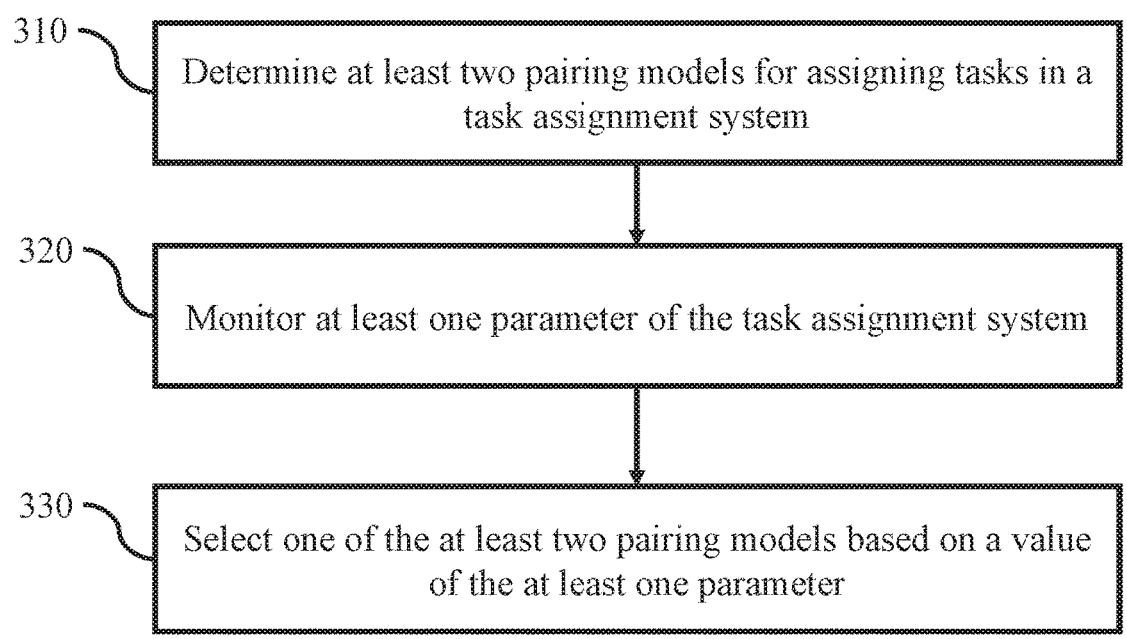
FIG. 3 shows a flow diagram of a task assignment method according to embodiments of the present disclosure.

FIG. 3 shows a task assignment method 300 according to embodiments of the present disclosure.

Task assignment method 300 may begin at block 310. At block 310, at least two pairing models for assigning tasks in a task assignment system may be determined. For example, in a sales queue, one pairing model may be to increase overall revenue generated by agents processing tasks in the sales queue (e.g., talking to callers in a call center interested in buying services from the company of the agents). A second pairing model may be to reduce AHT for tasks (e.g., complete a sales call relatively quickly).

Task assignment method 300 may proceed to block 320. At block 320, at least one parameter of the task assignment system may be monitored. For example, a parameter may be the size of the task queue. Example of other parameters may include a switch between L1 and L2 (i.e., a switch between agent surplus and task surplus conditions), unexpected reduction in capacity (e.g., sites/queues/agents workstations/ server/switch failure or recovery), number of agents assigned to the task queue (or number of agents available/logged in/idle), schedule-based/cycling changes to the goals and models, time of the day or amount of elapsed time, etc.

Task assignment method 300 may proceed to block 330. At block 330, one of the at least two pairing models (determined at block 310) may be selected based on a value of the at least one parameter (monitored at block 320). For example, when the parameter is the size of the task queue in the task assignment system and the task assignment system is operating in L1 (i.e., agent surplus), or the size of the task queue in L2 is less than (or equal to) a certain size (e.g., 5, 10, 20 tasks, etc.), a pairing model that increases revenue may be selected. When the task assignment system detects that the size of the task queue in L2 is greater than (or equal to) a threshold size, a pairing model that decreases average handle time may be selected.

After selecting one of the at least two pairing models, the task assignment method 300 may end.

At this point it should be noted that adapting behavioral pairing to runtime conditions in a task assignment system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with adapting behavioral pairing to runtime conditions in a task assignment system in accordance with the present disclosure as described above. Alternatively, one or more processors operating in accordance with instructions may implement the functions associated with adapting behavioral pairing to runtime conditions in a task assignment system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer processor-implemented method for adapting pairing to runtime conditions in a task assignment system comprising:
    associating, by at least one computer processor communicatively coupled to and configured to operate in the task assignment system, a first pairing model with a first runtime state of the task assignment system;
    associating, by the at least one computer processor, a second pairing model with a second runtime state of the task assignment system;
    determining, by the at least one computer processor, a runtime state change in the task assignment system from the first runtime state to the second runtime state; and
    switching, by the at least one computer processor, from the first pairing model to the second pairing model for pairing in the task assignment system.

2. The method of claim 1, wherein the task assignment system is a contact center system.

3. The method of claim 1, wherein determining the runtime state change comprises at least one of:
    detecting a change from the first runtime state representing an agent surplus state to the second runtime state representing a task surplus state; and
    detecting a change from the first runtime state representing the task surplus state to the second runtime state representing the agent surplus state.

4. The method of claim 1, wherein determining the runtime state change comprises at least one of:
    detecting a change from the first runtime state representing a first size of a queue of tasks greater than a threshold size to the second runtime state representing a second size of the queue of tasks less than the threshold size; and
    detecting a change from the first runtime state representing the second size of the queue of tasks less than the threshold size to the second runtime state representing the first size of the queue of tasks greater than the threshold size.

5. The method of claim 1, wherein the first runtime state represents a normal state of at least one component of the task assignment system, and wherein the second runtime state represents a failure state or a recovery state of the at least one component.

6. The method of claim 1, wherein the first runtime state represents a first number of agents greater than a threshold number, wherein the second runtime state represents a second number of agents less than the threshold number, and wherein the first and second numbers of agents indicate how many agents are at least one of assigned to tasks, available, logged-in, or idle.

7. The method of claim 1, wherein the first runtime state represents a first time range, and wherein the second runtime state represents a second time range.

8. The method of claim 1, wherein at least one of the first and second pairing models is a behavioral pairing model.

9. The method of claim 1, wherein a goal of at least one of the first and second pairing models is at least one of increasing revenue, decreasing average handle time, improving customer satisfaction, increasing upgrade/cross-sell rates, and increasing customer retention rates.

10. A system for adapting pairing to runtime conditions in a task assignment system comprising:
    at least one computer processor communicatively coupled to and configured to operate in the task assignment system, wherein the at least one computer processor is further configured to:
        associate a first pairing model with a first runtime state of the task assignment system;
        associate a second pairing model with a second runtime state of the task assignment system;
        determine a runtime state change in the task assignment system from the first runtime state to the second runtime state; and switch from the first pairing model to the second pairing model for pairing in the task assignment system.

11. The system of claim 10, wherein the task assignment system is a contact center system.

12. The system of claim 10, wherein the at least one computer processor is further configured to determine the runtime state change by at least one of:
detecting a change from the first runtime state representing an agent surplus state to the second runtime state representing a task surplus state; and
detecting a change from the first runtime state representing the task surplus state to the second runtime state representing the agent surplus state.

13. The system of claim 10, wherein the at least one computer processor is further configured to determine the runtime state change by at least one of:
detecting a change from the first runtime state representing a first size of a queue of tasks greater than a threshold size to the second runtime state representing a second size of the queue of tasks less than the threshold size; and
detecting a change from the first runtime state representing the second size of the queue of tasks less than the threshold size to the second runtime state representing the first size of the queue of tasks greater than the threshold size.

14. The system of claim 10, wherein the first runtime state represents a normal state of at least one component of the task assignment system, and wherein the second runtime state represents a failure state or a recovery state of the at least one component.

15. The system of claim 10, wherein the first runtime state represents a first number of agents greater than a threshold number, wherein the second runtime state represents a second number of agents less than the threshold number, and wherein the first and second numbers of agents indicate how many agents are at least one of assigned to tasks, available, logged-in, or idle.

16. The system of claim 10, wherein the first runtime state represents a first time range, and wherein the second runtime state represents a second time range.

17. The system of claim 10, wherein at least one of the first and second pairing models is a behavioral pairing model.

18. The system of claim 10, wherein a goal of at least one of the first and second pairing models is at least one of increasing revenue, decreasing average handle time, improving customer satisfaction, increasing upgrade/cross-sell rates, and increasing customer retention rates.

19. An article of manufacture for adapting pairing to runtime conditions in a task assignment system comprising:
a non-transitory processor readable medium; and
instructions stored on the medium;
wherein the instructions are configured to be readable from the medium by at least one computer processor communicatively coupled to and configured to operate in the task assignment system and thereby cause the at least one computer processor to operate so as to:
associate a first pairing model with a first runtime state of the task assignment system;
associate a second pairing model with a second runtime state of the task assignment system;
determine a runtime state change in the task assignment system from the first runtime state to the second runtime state; and
switch from the first pairing model to the second pairing model for pairing in the task assignment system.

20. The article of manufacture of claim 19, wherein the task assignment system is a contact center system.

21. The article of manufacture of claim 19, wherein the at least one computer processor is further configured to determine the runtime state change by at least one of:
detecting a change from the first runtime state representing an agent surplus state to the second runtime state representing a task surplus state; and
detecting a change from the first runtime state representing the task surplus state to the second runtime state representing the agent surplus state.

22. The article of manufacture of claim 19, wherein the at least one computer processor is further configured to determine the runtime state change by at least one of:
detecting a change from the first runtime state representing a first size of a queue of tasks greater than a threshold size to the second runtime state representing a second size of the queue of tasks less than the threshold size; and
detecting a change from the first runtime state representing the second size of the queue of tasks less than the threshold size to the second runtime state representing the first size of the queue of tasks greater than the threshold size.

23. The article of manufacture of claim 19, wherein the first runtime state represents a normal state of at least one component of the task assignment system, and wherein the second runtime state represents a failure state or a recovery state of the at least one component.

24. The article of manufacture of claim 19, wherein the first runtime state represents a first number of agents greater than a threshold number, wherein the second runtime state represents a second number of agents less than the threshold number, and wherein the first and second numbers of agents indicate how many agents are at least one of assigned to tasks, available, logged-in, or idle.

25. The article of manufacture of claim 19, wherein the first runtime state represents a first time range, and wherein the second runtime state represents a second time range.

26. The article of manufacture of claim 19, wherein at least one of the first and second pairing models is a behavioral pairing model.

27. The article of manufacture of claim 19, wherein a goal of at least one of the first and second pairing models is at least one of increasing revenue, decreasing average handle time, improving customer satisfaction, increasing upgrade/cross-sell rates, and increasing customer retention rates.

* * * * *